(12) United States Patent
Ying

(10) Patent No.: US 9,836,875 B2
(45) Date of Patent: Dec. 5, 2017

(54) VIEWING ANGLE IMAGE MANIPULATION BASED ON DEVICE ROTATION

(71) Applicant: Flipboard, Inc., Palo Alto, CA (US)

(72) Inventor: Charles Ying, Piedmont, CA (US)

(73) Assignee: FLIPBOARD, INC., Palo Alto, CA (US)

( * ) Notice: Subject to any disclaimer, the term of this patent is extended or adjusted under 35 U.S.C. 154(b) by 144 days.

(21) Appl. No.: 14/152,462

(22) Filed: Jan. 10, 2014

(65) Prior Publication Data

US 2014/0320535 A1    Oct. 30, 2014

Related U.S. Application Data

(60) Provisional application No. 61/816,453, filed on Apr. 26, 2013.

(51) Int. Cl.
```
G06T 15/50    (2011.01)
G06T 15/20    (2011.01)
G06T 19/00    (2011.01)
```

(52) U.S. Cl.
CPC .......... G06T 15/503 (2013.01); G06T 15/205 (2013.01); G06T 19/003 (2013.01)

(58) Field of Classification Search
CPC .......... H04N 21/6587; H04N 5/23238; H04N 2013/0088; G06T 3/4038; G06T 15/503; G06T 15/205; G09G 5/377
USPC .............. 345/649, 650, 659; 348/36, 37, 39, 348/208.4; 382/284, 294
See application file for complete search history.

(56) References Cited

U.S. PATENT DOCUMENTS

| | | | | |
|---|---|---|---|---|
| 6,011,558 A | * | 1/2000 | Hsieh | G06T 11/00 345/633 |
| 6,075,905 A | * | 6/2000 | Herman | G06K 9/32 382/284 |
| 6,222,937 B1 | * | 4/2001 | Cohen | G06T 15/06 345/634 |

(Continued)

FOREIGN PATENT DOCUMENTS

| | | |
|---|---|---|
| CN | 1926496 A | 3/2007 |
| CN | 1953504 A | 4/2007 |

(Continued)

OTHER PUBLICATIONS

WO 2013/121897 machine translation of PCT/ JP2013/052329, filed Jan. 2, 2013.*

(Continued)

*Primary Examiner* — Chante Harrison
(74) *Attorney, Agent, or Firm* — Fenwick & West LLP

(57) ABSTRACT

A user device uses sensors to determine the rotation of the user device with respect to a reference orientation. Using the user device rotation, an image manipulation module accesses images that are associated with image rotations. A set of the images are selected based on the device rotation to select images that have image orientations corresponding to the device rotation. A weight may be determined for each selected image, and the images are combined to generate a blended image using the weights. The blended image is displayed to the user, and as the rotation of the user devices changes, the process is repeated to display changing blended images based on the device rotation, thereby animating the rotation effect.

29 Claims, 4 Drawing Sheets

(56) References Cited

U.S. PATENT DOCUMENTS

| | | |
|---|---|---|
| 2003/0234797 A1 | 12/2003 | Williams et al. |
| 2006/0017692 A1 | 1/2006 | Wehrenberg et al. |
| 2006/0061599 A1 | 3/2006 | Yu et al. |
| 2006/0077211 A1 | 4/2006 | Zhou |
| 2006/0083441 A1 | 4/2006 | Huang |
| 2007/0091188 A1 | 4/2007 | Chen et al. |
| 2009/0153549 A1 | 6/2009 | Lynch et al. |
| 2011/0298829 A1 | 12/2011 | Stafford et al. |
| 2011/0298929 A1* | 12/2011 | Garcia ............... H04N 7/181 348/159 |
| 2011/0310094 A1 | 12/2011 | Park et al. |
| 2012/0262474 A1* | 10/2012 | Jancourtz ............. G06T 3/4007 345/649 |
| 2012/0293538 A1 | 11/2012 | Ording |
| 2013/0021377 A1 | 1/2013 | Doll |
| 2013/0141523 A1* | 6/2013 | Banta ............... H04N 5/23238 348/36 |
| 2013/0169687 A1 | 7/2013 | Williamson et al. |
| 2013/0202154 A1* | 8/2013 | Hirano ............... G06T 3/0006 382/103 |
| 2013/0258122 A1* | 10/2013 | Keane ............... H04N 5/23267 348/208.4 |
| 2014/0118479 A1* | 5/2014 | Rapoport ........... H04N 1/00183 348/36 |
| 2014/0247279 A1* | 9/2014 | Nicholas ............... G06F 3/011 345/633 |
| 2014/0300686 A1* | 10/2014 | Campbell .......... H04N 5/23238 348/36 |
| 2014/0375762 A1* | 12/2014 | Ohki ................. H04N 5/23238 348/36 |
| 2015/0325038 A1* | 11/2015 | Baker ............... H04N 13/0007 345/426 |

FOREIGN PATENT DOCUMENTS

| | | |
|---|---|---|
| CN | 102270041 A | 12/2011 |
| EP | 0702494 A2 | 3/1996 |

OTHER PUBLICATIONS

International Search Report and Written Opinion for International Application No. PCT/US2014/035163, dated Aug. 29, 2014, 14 pages.

"remove jerkiness in stop frame animation," Adobe After Effects, Mar. 21, 2004, 3 Pages, [online] [retrieved on Nov. 8, 2016] Retrieved from the Internet <URL:https://forums.creati vecow.net/archivethread/2/539715>.

Extended European Search Report for European Patent Application No. EP 14787757.5, dated Nov. 11, 2016, 8 Pages.

Office Action for Chinese Patent Application No. CN 201480023288.2, dated Sep. 19, 2016, 17 Pages.

Office Action for Chinese Patent Application No. CN 201480023288.2, dated Sep. 19, 2016, 12 Pages (With Concise Explanation of Relevance).

$2^{nd}$ Office Action for Chinese Patent Application No. CN 2014800232882, Jun. 5, 2017, 23 Pages.

* cited by examiner

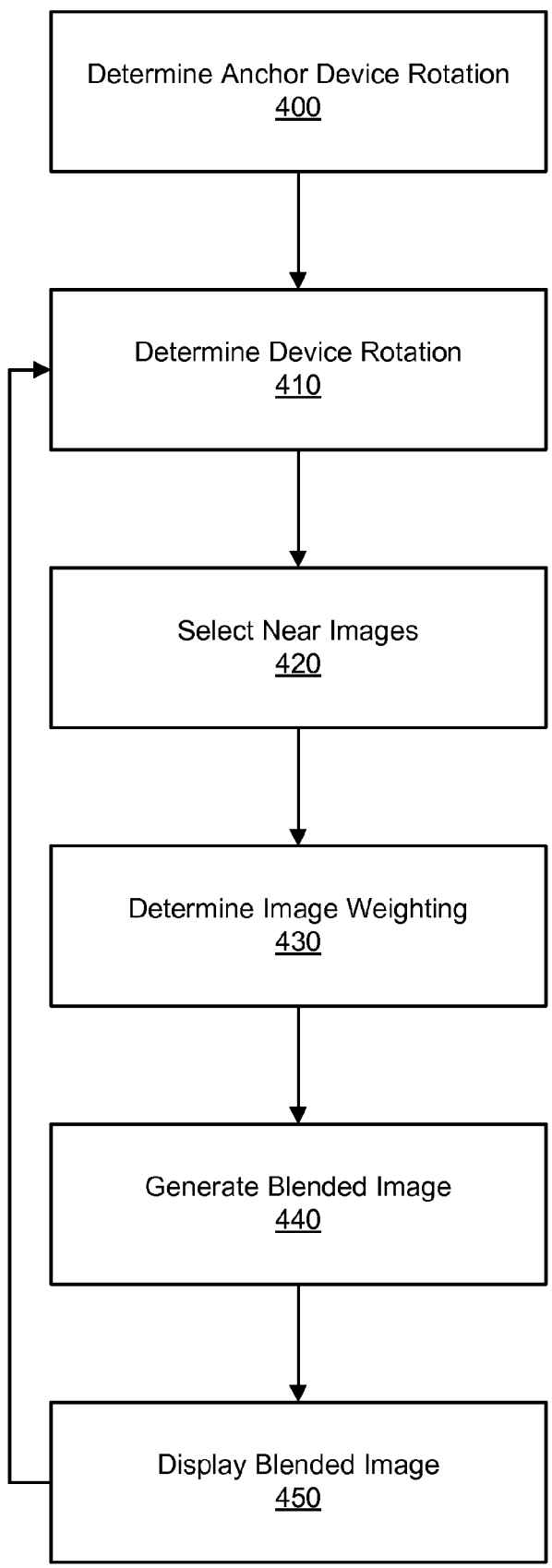

VIEWING ANGLE IMAGE MANIPULATION BASED ON DEVICE ROTATION

CROSS REFERENCE TO RELATED APPLICATIONS

This application claims the benefit of U.S. Provisional Application No. 61/816,453, filed Apr. 26, 2013, which is incorporated by reference in its entirety.

BACKGROUND

This invention relates generally to displaying an image of an object, and particularly to modifying the image based on a device orientation.

Images of objects are typically displayed to a user as an unmoving, static photo. When different views of an object are provided by an image, a user typically selects to move individually from one image to another image to see the different views, either by specifically selecting an image from a gallery or by sequentially progressing through a set of images. This makes it difficult for a user to see views of an object between the views provided by the images. Similarly, the person taking the images cannot adequately display the various aspects of the object to a user.

SUMMARY

In various embodiments of the invention, a user manipulates a user device to generate different views of a static object based on the orientation of the user device. A set of images of the object is captured from a plurality of different viewing angles. Each image in the set of images of the object is associated with an image orientation, based on the viewing angle from which the image was captured.

To create the set of images, a camera captures images of an object and associates an image orientation with each image. The images may be captured under various conditions. In one embodiment, the camera is moved to different locations to capture images of the object from different locations (or viewing angles) around the object. From each location, the camera is oriented to aim at the object, and the orientation of the camera aiming at the object is stored as the image orientation.

In another embodiment, a lighting source or sources are moved to different locations to light the object from various angles. In this embodiment, the camera is held stationary relative to the object, and other aspects of the environment are changed. For example, a lighting source may be moved in the environment to light the object from various angles. In this embodiment, the angle at which the lighting source illuminates the object is stored as the image orientation.

In another embodiment, the object is rotated to different angles. In this embodiment, the camera is held stationary relative to the object, and the object itself is changed. The image orientation in this embodiment is based on the rotation of the object. Various embodiments may alter further aspects of the image capture process to associate an image orientation with the captured images, including a combination of any of the methods described.

The orientation associated with each image may be represented as an angle of rotation. The orientation may also be expressed in a spherical coordinate system as a pair of angular distances from a line extending perpendicularly from a reference point (or anchor point) on a plane, where the object sits at or near the reference point. In this expression, each orientation corresponds to a point on the spherical coordinate system.

To render an image of the object based on the device's orientation, the user device determines the orientation of the device, e.g., using a set of gyroscopic sensors or accelerometers. The orientation of the device, or "device orientation," may be expressed relative to a reference (or anchor) orientation, where an initial orientation of the device is used to determine the reference orientation of the user device. The device orientation relative to the reference orientation is termed the "device rotation." The initial orientation calibrates the reference orientation and is determined from the orientation of the device when the device initially displays the image, when an image manipulation module is initialized, or with respect to the ground (i.e., gravity).

The device rotation is used to select one or more images of the set of images. For example, a subset of the images having image orientations closest to the device rotation may be selected, such as the images having the two closest image orientations in each orthogonal direction. The relative distance (e.g., angular distance) of the device rotation relative to the image orientation of each selected images is used to determine weights for the selected images. The user device generates a blended image using the selected images and the respective weights for each selected image. In another embodiment, the image having an orientation closest to the device rotation is selected and used for display, without blending of multiple images.

The resulting blended image is shown on the user device. This process may be repeated continuously, or upon a certain threshold (e.g., a movement of the device more than a predetermined amount), such that subsequent blended images are calculated as the user moves the user device and new orientations relative to the reference orientation are calculated. By re-calculating the blended image as the user device moves, the image displayed to the user is changed as the user moves the user device to varying device orientations, and the resulting displayed image may "shimmer" because the lighting of the object changes as the images are selected and weighted differently for the blended image.

BRIEF DESCRIPTION OF THE DRAWINGS

FIG. 4 is a method of generating and displaying rotation-based images of an object according to an embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

A system shows users various views of an object as the user rotates a user device. Rather than render a three-dimensional model or show a user an individual image, an image is generated that combines two or more images based on the orientation of the user device. By combining and blending the images based on the orientation of the device, a user is shown different aspects of the object with a smooth transition between the images of the object that were actually captured.

Figure 1:
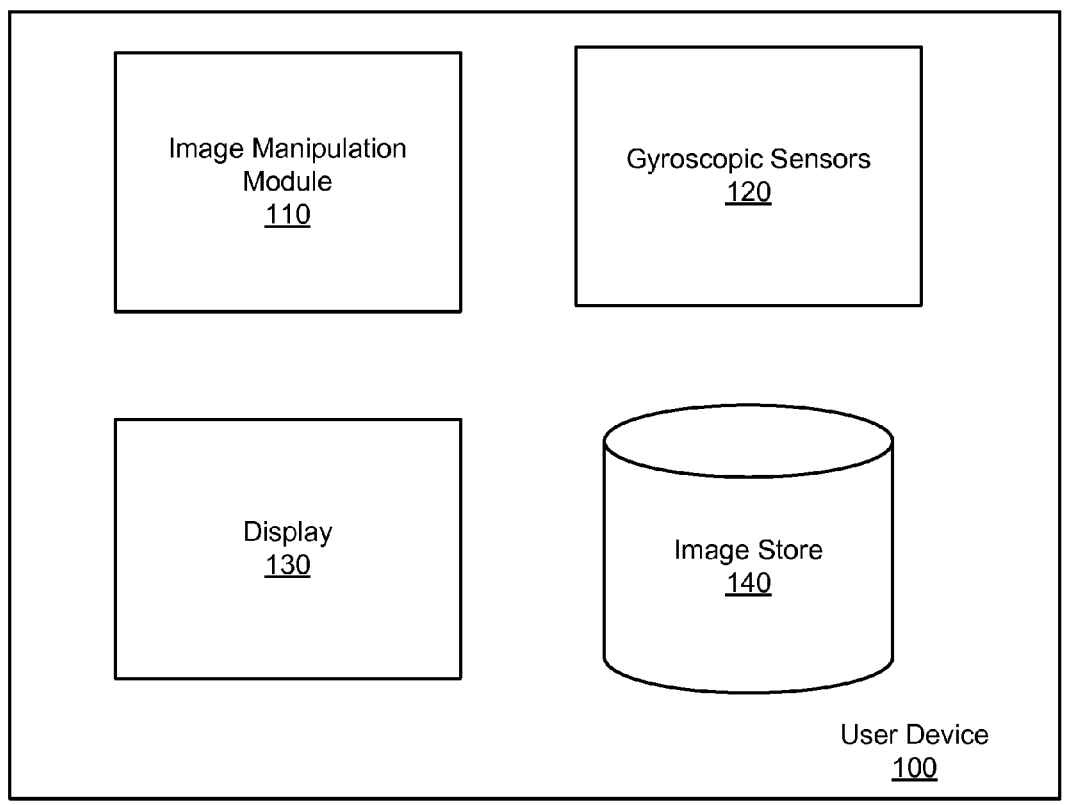
FIG. 1 is a user device for generating rotation-dependent images of an object according to an embodiment.

FIG. 1 is a user device 100 for generating orientation-dependent images of an object according to an embodiment. The user device 100 includes an image manipulation module 110, a set of gyroscopic sensors 120, a display 130, and an image store 140. The user device 100 may be any suitable hand-held computerized device, such as a tablet computer, smart phone, gaming system, and other systems including components for performing the described actions. Accordingly, the user device 100 may include various additional features, modules, and elements according to various embodiments. Components such as the image manipulation module 110 or image store 140 may be incorporated into larger modules or applications executing on the user device 100, such as a content distribution system or as a part of a web page or browser. Thus, these modules and data storage may be remotely located to the user device 100 and retrieved from the remote location for use and execution by the user device 100.

Gyroscopic sensors 120 determine a set of rotation measurements of the user device 100. The gyroscopic sensors 120 provide an indication of the gyroscopic rotation of the sensors, and generally of the user device 100. In one embodiment, the gyroscopic sensors 120 directly sense rotational measurements such as pitch, roll, and yaw. In alternate embodiments, the gyroscopic sensors 120 are accelerometers that determine angular acceleration of the user device 100, which is integrated to determine the rotational measurement from a reference orientation. The orientation of the user device 100 is termed the device orientation. The raw rotation measurements are converted to the device orientation by determining the orientation of the device relative to an initialized orientation termed a "reference orientation." The reference orientation may be determined by the gyroscopic sensors 120 when the gyroscopic sensors 120 are initialized, or the reference orientation may be determined by the image manipulation module 110. The rotation of the device from the reference point is termed the device rotation.

The image store 140 stores a set of images relating to an object. Each of the images in the image store is associated with an image orientation. The image orientation is an orientation associated with the image, typically measured in a rotation (or pair of rotations) from the reference orientation. Thus, an image orientation may indicate a 10° rotation in pitch and 5° rotation in roll relative to the reference orientation. As described further with respect to FIG. 2, the set of image orientations typically covers a range of pitch and roll between a specified range, such as [−45°, +45°], with images associated with each 45 degree change in the range. Thus, in this example, nine images may be used for the range [−45°, +45°] for each pitch/roll coordinate set: (+45°, +45°), (+45°, 0°), (+45°, −45°), . . . , (−45°, 0°), (−45°, −45°). The set of images may include any number of images with image coordinates densely or sparsely covering the coordinate range.

The image manipulation module 110 generates an image based on the rotation of the user device 100 as determined by the gyroscopic sensors 120. The generated image is shown on a display 130. The image manipulation module 110 accesses the device orientation of the user device 100 from the gyroscopic sensors 120 and the images and image rotation from the image store 140. If not provided by the gyroscopic sensors 120, the image manipulation module 110 determines the device rotation relative to the reference orientation. The device rotation is used to determine the images that most closely match the rotation of the user device 100. In the example of image orientations provided above, a device rotation (−30,−35) is most closely matched by the image rotations (−45, 0), (0, −45), and (−45, −45). To determine the "closest match," the image manipulation module 110 determines a distance of the device rotation to each of the image orientations. In one embodiment, the distance between the device rotation and the image orientations is computed by determining the size of an angle between the device rotation and the image orientation, and any suitable means may be used in other embodiments. The images with the lowest distance are selected, up to a maximum, such as three.

In one embodiment, a difference in angles between the device rotation and pairs of image orientations is also calculated, and nearest images that are too similar in angle (i.e., too close) are excluded. As an example, if a pair of images do not differ by at least a threshold angle (such as 30°, 45°, or 60°) from one another relative to the device rotation, the image in the pair that is a further distance is excluded. For certain device rotations outside the range of image orientations, this causes only a single image to be selected.

Using the selected images, the image manipulation module 110 generates a blended image of the selected images corresponding to the device orientation. To blend the images, the image manipulation module 110 interpolates the values of the images using a weighting based on the distance of the device to each image. The weighting of each image in one embodiment is calculated based on the distance of the selected image divided by a total distance of all selected images. In one embodiment, rather than a weighting interpolation, the closest image is selected as a primary image and modified by a weight of the remaining images based on the distance of the other remaining images. In one embodiment, the pixel values are averaged without weighing individual images. In this way, as the device orientation (and therefore the device rotation) changes, the image manipulation module 110 generates a new blended image based on the set of images without requiring a pre-existing image relating to the exact device rotation, and provides a smooth change in the generated image as the device changes orientation.

In one embodiment, the image manipulation module 110 generates images for presentation to the user as a part of an advertisement. The generated images allow an advertiser to provide various views of an advertiser's item, such as jewelry or an article of clothing in an appealing way using the blended images. These blended images would not be able to be represented adequately in a static image or by a rendering from a three-dimensional model.

Figure 2:
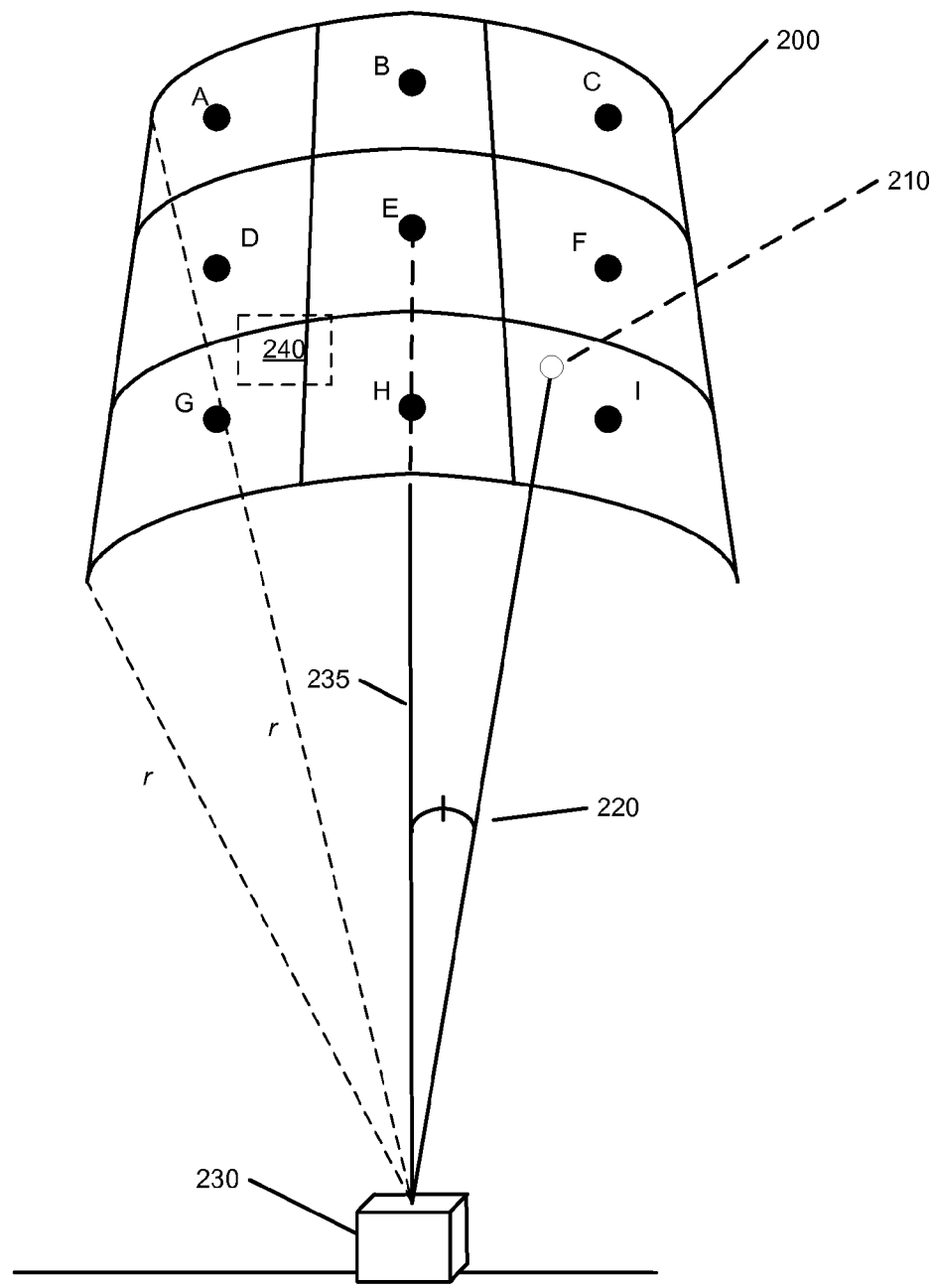
FIG. 2 is a conceptual illustration of various image orientations according to an embodiment.

FIG. 2 is a conceptual illustration of various image orientations according to an embodiment. In the illustration of FIG. 2, the rotational values are represented as a set of coordinates on a spherical projection with a radius from a reference point 230. That is, the spherical projection 200 indicates a curved plane of a sphere with a constant radius r from the reference point 230. A relative angle 220 indicates the angle of an orientation relative to a reference angle 235 from the reference point 230. In this example, the device rotation on the spherical projection is located at point 210 on the spherical projection with a relative angle 220. A set of nine image orientations is converted to a position on the spherical projection 200, denoted points A-I. Though not shown, each image orientation has a corresponding angular value, representing the angular position of the image orientation from the reference angle. In this example, point E has no angular position from the reference angle. That is, point E is associated with an image orientation (0°,0°). The angular value of the image orientation is used to determine the location on the spherical projection by determining the point at which an orthogonal ray projected at the angular value intersects the reference point 230. Though described here with reference to a conceptual illustration, in one embodiment the image orientations and device rotation are converted to a coordinate system on the spherical projection. In another embodiment, the device rotations are maintained in an angular (rotational) coordinate system.

In this example, point E corresponds to an image orientation with a relative angle matching the reference point (i.e., image orientation (0, 0)). Thus, the surrounding image orientations indicate rotations of the user device in orientations tilting away from the reference orientation. In this example, the device rotation is indicated at point 210. Using the spherical projection to measure a distance, which can now be measured as a Euclidian distance on the projection, image orientations corresponding to points F, H, and I are closest to the device rotation point 210. Alternatively, the distance may be measured as an angular distance of between the device rotation and the image orientations. The images associated with F, H, and I are selected for the image generation. As illustrated in FIG. 2, the selection of these points enables an image to be created for point 210 despite that no images exist with image orientations corresponding to the device rotation.

In addition to generating the image, the device rotation may be used for generating additional events on the user device. For example, the user may rotate the device beyond the range of device rotations for which there are images. A device rotation beyond the rotation of point I, for example, may trigger an event such as an indication to the user to return towards the reference orientation.

In one embodiment, a region 240 is designated for generating additional events. For example, the image manipulation module 110 may be included in an advertisement. The various images may be used to display a product in particular views or perspectives. The region 240 may be used to indicate that a user may see a particularly appealing view of the object if the user continues to rotate the device towards G, or to point out a feature of the product that is now apparent at the views generated in the region 240. For example, an image overlay of a sparkle may be added to the blended image of a gemstone when the device is oriented within the predefined region 240. Alternatively, the additional events may include sounds, launching other applications, overlaying text and/or images, or any other desired event. Though shown here as a region 240 of coordinates on the spherical projection 200, a region may be defined by a range of device rotations.

Figure 3A:
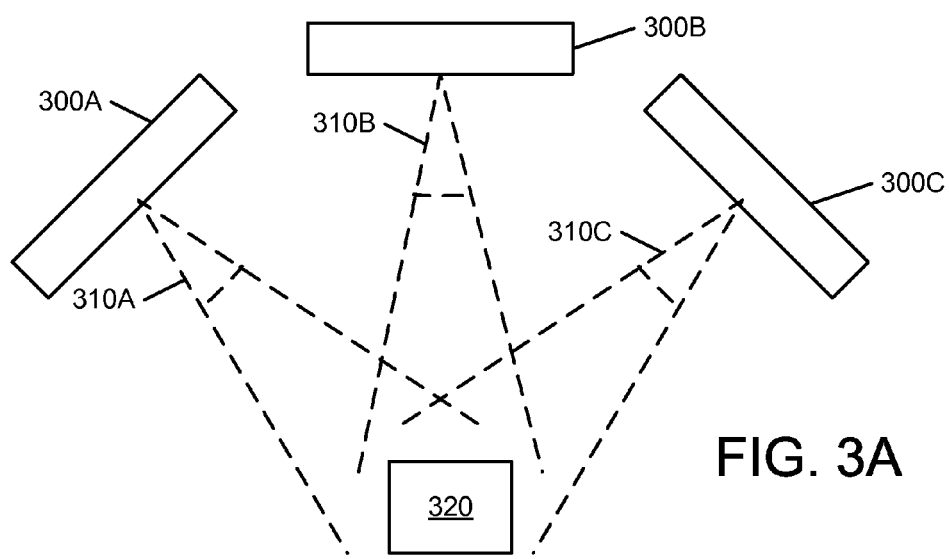
FIGS. 3A-C are diagrams illustrating image capture including an image orientation according to an embodiment.
Figure 3B:
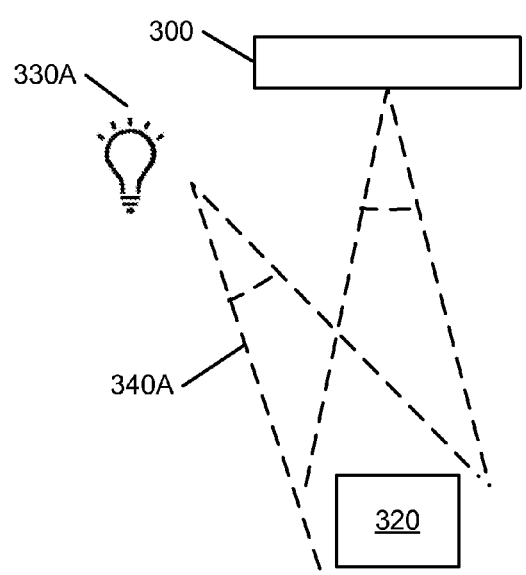
Figure 3C:
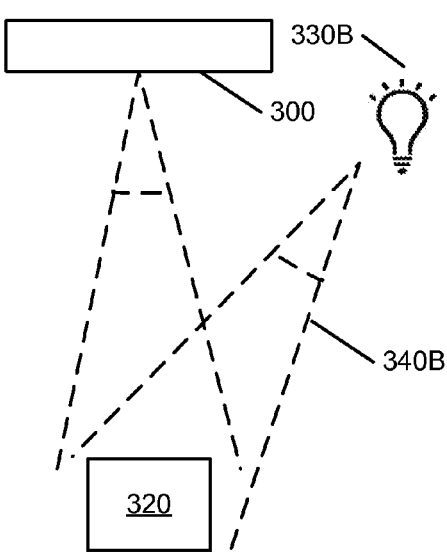

FIGS. 3A-C are diagrams illustrating image capture including an image orientation according to an embodiment. FIG. 3A shows a set of camera positions 300 capturing an image of an object 320. In one embodiment, the camera may also operate as a user device 100, though in other embodiments, cameras with other characteristics may be used. Each camera position 300A, 300B, 300C captures an image of the object 320 from a different angle 310A, 310B, or 310C, respectively. The camera is moved to each location 300 (or separate cameras are used) and an image of the object 320 is captured. Each of the camera positions 300 is typically the same distance from the object 320, such that the object 320 maintains the same size and other features when the image is incorporated in a blended image. Though shown here in two dimensions, the camera may be placed in many places in three dimensions to capture images at a variety of locations around the object 320. The camera may include gyroscopic sensors to automatically determine an angle 310A, 310B, or 310C for the camera position 300 capturing the image, or the angle 310A, 310B, or 310C may be determined by other means, such as operator entry.

In the embodiment of FIG. 3A, the camera position 300 is moved to different locations to capture various perspectives of the object 320. In the embodiments of FIGS. 3B and 3C, the camera position 300 remains constant, while a lighting source 330 is moved to different positions. FIG. 3B shows one position of the lighting source 330A, and FIG. 3C shows a second position of the lighting source 330B. In this embodiment, each lighting source 330A or 330B is associated with a corresponding angle of the lighting source 340A or 340B, respectively. The angle of the lighting source 340 is used to determine an associated image orientation of the captured image at each camera location. In this embodiment, when the captured images are shown in the image manipulation module 100, the images reflect different lighting of the object 320, and thereby allow a user to rotate the user device and see the reflectivity of the object 320. This embodiment may be ideal, for example, for illustrating objects 320 that have highly variable reflections based on the lighting source of the object 320, such as jewelry. In another embodiment (not shown), the object 320 is rotated, and the rotation of the object 320 is used to determine an associated image orientation. In other embodiments, any combination of changing the camera position 300, the lighting source position 330, and rotating the object 320 may be used. For example, the camera position and lighting source position 330 are moved together in one embodiment.

FIG. 4 is a method of generating and displaying rotation-based images of an object according to an embodiment. This method is performed in one embodiment by the image manipulation module 110. The image manipulation module 110 determines 400 a reference orientation from which changes in the device rotation will be measured. Next, the device rotation is determined 410 by accessing the gyroscopic sensors 120. The distance to the image orientations in the set of images is determined and the nearest images are selected 420. Using the nearest images, the weighting of each image is determined 430 based on the distance of the device rotation relative to the selected image rotations as described above. Next, the image manipulation module generates 440 a blended image using the weighting by interpolation or other means as described above. Next, the generated blended image is displayed 450 on the user device, and the next reading of the device rotation is determined 410. In this way, as the user device is rotated, the user is presented with varying images of the object that are generated as the user rotates the device.

In various embodiments the image manipulation module 110 and image store 140 are located at a remote server in communication with the user device 100. Accordingly, certain steps are performed at the server in these embodiments. For example, the orientation of the device may be transmitted to the remote server, which generates a blended image and transmits the blended image to the user device 100 for display to the user.

SUMMARY

The foregoing description of the embodiments of the invention has been presented for the purpose of illustration;

it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method for image manipulation based on device rotation, the method comprising:
   determining a device rotation of a user device, the device rotation determined based on an orientation of the user device with respect to a reference orientation;
   accessing a plurality of stored images, each image of the plurality of images associated with an image orientation;
   selecting a plurality of near images from the plurality of images, wherein the selected near images have image orientations relative to the reference orientation that correspond to the orientation of the user device;
   generating a blended image by combining the selected plurality of near images, wherein generating the blended image comprises:
      determining a first angle between the device rotation and a first image orientation of a first near image of the selected near images;
      determining a second angle between the device rotation and a second image orientation of a second near image of the selected near images;
      responsive to a difference between the first angle and the second angle not exceeding a threshold angle, and responsive to the first angle exceeding the second angle, excluding the first near image from the plurality of near images; and
      generating a blended image by combining a plurality of remaining near images from the selected near images; and
   outputting the blended image for display on the user device.

2. The method of claim 1, wherein the plurality of images are images of an object.

3. The method of claim 1, wherein the image orientation of an image in the plurality of images is based on an angle at which the image was taken relative to an object.

4. The method of claim 1, wherein the image orientation of an image in the plurality of images is based on an angle at which an object in an environment was located when the image was taken.

5. The method of claim 1, wherein the image orientation of an image in the plurality of images is based on an angle at which an object was rotated when the image was taken.

6. The method of claim 1, further comprising:
   determining an updated device rotation based on a changed orientation of the user device with respect to the reference orientation; and
   repeating the selecting, generating, and outputting steps using the updated device rotation.

7. The method of claim 1, further comprising determining a weight for each of the selected plurality of near images, the weight based on a difference between the device rotation and the image orientation, and wherein the generated blended image is based on the weight associated with each near image.

8. The method of claim 7, wherein the difference between the device rotation and the image orientation is measured in a distance on a spherical projection.

9. The method of claim 7, wherein generating the blended image comprises interpolating pixel values of each near image in the plurality of near images based on the associated weights.

10. The method of claim 1, further comprising:
determining that the device rotation is within a region comprising a range of device rotations; and
performing an event based on determining that the device rotation is within the region.

11. The method of claim 10, wherein the event comprises a notification, an image overlay, a sound, or launching an application.

12. The method of claim 1, wherein the device rotation is determined by a sensor on the user device.

13. The method of claim 1, wherein the device rotation is determined by a server that receives the orientation of the user device, and the server generates the blended image.

14. A computer program product for image manipulation based on device rotation, the computer program product comprising a computer-readable storage medium having instructions encoded thereon that, when executed by a processor, cause the processor to perform steps comprising:
determining a device rotation of a user device, the device rotation determined based on an orientation of the user device with respect to a reference orientation;
accessing a plurality of stored images, each image of the plurality of images associated with an image orientation;
selecting a plurality of near images from the plurality of images, wherein the selected near images have image orientations relative to the reference orientation that correspond to the orientation of the user device;
generating a blended image by combining the selected plurality of near images, wherein generating the blended image comprises:
determining a first angle between the device rotation and a first image orientation of a first near image of the selected near images;
determining a second angle between the device rotation and a second image orientation of a second near image of the selected near images;
responsive to a difference between the first angle and the second angle not exceeding a threshold angle, and responsive to the first angle exceeding the second angle, excluding the first near image from the plurality of near images; and
generating a blended image by combining a plurality of remaining near images from the selected near images; and
outputting the blended image for display on the user device.

15. The computer program product of claim 14, wherein the image orientation of an image in the plurality of images is based on an angle at which the image was taken relative to an object.

16. The computer program product of claim 14, wherein the image orientation of an image in the plurality of images is based on an angle at which an object in an environment was located when the image was taken.

17. The computer program product of claim 14, wherein the image orientation of an image in the plurality of images is based on an angle at which an object was rotated when the image was taken.

18. The computer program product of claim 14, wherein the computer-readable storage medium further has instructions encoded thereon that, when executed by the processor, cause the processor to perform steps comprising:
determining an updated device rotation based on a changed orientation of the user device with respect to the reference orientation; and
repeating the selecting, generating, and outputting steps using the updated device rotation.

19. The computer program product of claim 14, wherein the computer-readable storage medium further has instructions encoded thereon that, when executed by the processor, cause the processor to perform steps comprising: determining a weight for each of the selected plurality of near images, the weight based on a difference between the device rotation and the image orientation, and wherein the generated blended image is based on the weight associated with each near image.

20. The computer program product of claim 19, wherein the difference between the device rotation and the image orientation is measured in a distance on a spherical projection.

21. The computer program product of claim 19, wherein generating the blended image comprises interpolating pixel values of each near image in the plurality of near images based on the associated weights.

22. The computer program product of claim 14, wherein the computer-readable storage medium further has instructions encoded thereon that, when executed by the processor, cause the processor to perform steps comprising:
determining that the device rotation is within a region comprising a range of device rotations; and
performing an event based on determining that the device rotation is within the region.

23. The computer program product of claim 22, wherein the event comprises a notification, an image overlay, a sound, or launching an application.

24. The computer program product of claim 14, wherein the device rotation is determined by a sensor on the user device.

25. A method for image manipulation based on device rotation, the method comprising:
determining a device rotation of a user device, the device rotation determined based on an orientation of the user device with respect to a reference orientation;
accessing a plurality of stored images, each image of the plurality of images associated with an image orientation;
selecting a plurality of near images from the plurality of images, wherein the selected near images have image orientations relative to the reference orientation that correspond to the orientation of the user device;
for each selected near image:
determining an angle between the selected near image and the device orientation;
comparing the determined angle to a threshold angle associated with the device rotation;
responsive to determination that the determined angle exceeds a threshold angle, excluding the selected near image; and
combining a plurality of remaining near images from the selected near images to generate a blended image; and
outputting the blended image for display on the user device.

26. The method of claim 25, further comprising:
determining that the device rotation is within a region comprising a range of device rotations; and
performing an event based on determining that the device rotation is within the region.

27. The method of claim 26, wherein the event comprises a notification, an image overlay, a sound, or launching an application.

28. The method of claim 25, further comprising determining a weight for each of the selected plurality of near images, the weight based on a difference between the device rotation and the image orientation, and wherein the generated blended image is based on the weight associated with each near image.

29. The method of claim 28 further comprising interpolating pixel values of each selected near image in the plurality of selected near images based on the associated weights to generate the blended image.

* * * * *